No. 751,793. PATENTED FEB. 9, 1904.
C. VAN D. HILL.
GAS BURNER.
APPLICATION FILED NOV. 9, 1903.
NO MODEL.
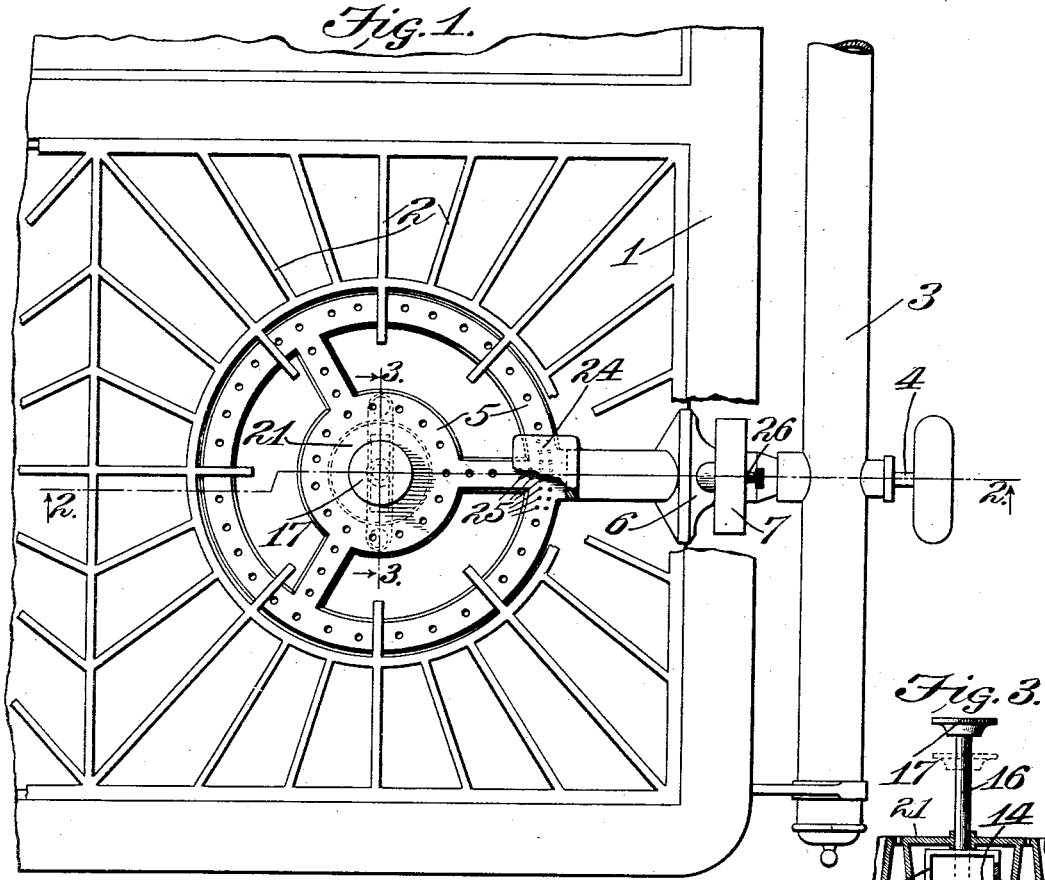
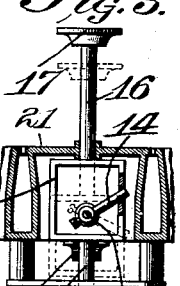
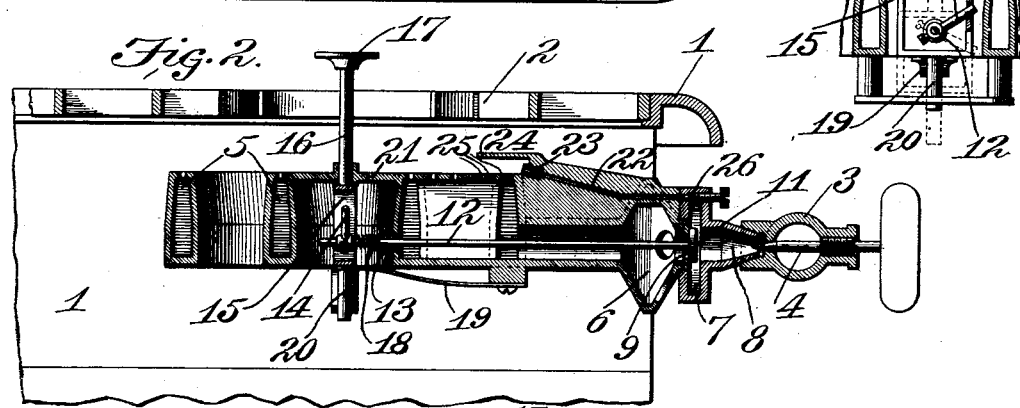
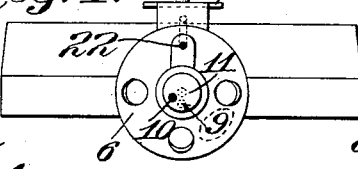
Witnesses:
G. A. Pennington
Ralph Kalish
Inventor:
Charles V. D. Hill
by Bakewell & Cornwall
Attys.
THE NORRIS PETERS CO., PHOTO-LITHO., WASHINGTON, D. C.

No. 751,793. Patented February 9, 1904.

UNITED STATES PATENT OFFICE.

CHARLES VAN DYKE HILL, OF ST. LOUIS, MISSOURI.

GAS-BURNER.

SPECIFICATION forming part of Letters Patent No. 751,793, dated February 9, 1904.

Application filed November 9, 1903. Serial No. 180,445. (No model.)

*To all whom it may concern:*

Be it known that I, CHARLES VAN DYKE HILL, a citizen of the United States, residing at the city of St. Louis, State of Missouri, have invented a certain new and useful Improvement in Gas-Burners, of which the following is a full, clear, and exact description, such as will enable others skilled in the art to which it appertains to make and use the same, reference being had to the accompanying drawings, forming part of this specification, in which—

Figure 1 is a top plan view of my improved gas-burner. Fig. 2 is a vertical sectional view on the line 2 2 of Fig. 1. Fig. 3 is a sectional view on the line 3 3 of Fig. 1, and Fig. 4 is an end elevational view of the burner.

This invention relates to a new and useful improvement in gas-burners, the object being to provide the burner with means whereby when a cooking vessel is present on the burner to be heated the valve is opened to admit a supply of gas to the burner from its source of supply and when said vessel is removed the valve is closed, so as to shut off said supply of gas to the burner, and in addition to the above a pilot-light is provided, so that when the vessel is removed it is unnecessary for the operator to again ignite the burner, the gas being ignited from the pilot-light when the vessel is again placed on the burner.

With these objects in view the invention consists in the construction, arrangement, and combination of the several parts, all as hereinafter described, and afterward pointed out in the claims.

In the drawings I have shown a portion of a gas-stove, comprising a frame 1, a grill 2, a manifold 3, and its needle-valve 4 for admitting a supply of gas to the burner.

5 indicates the burner, which may be of any suitable construction, which burner preferably consists of two hollow concentric rings with openings in their upper faces, said rings being connected by radially-disposed hollow connections whose upper faces are also provided with openings.

6 indicates an air-mixing chamber arranged at one side of the burner and preferably integral therewith, which mixing-chamber has a hollow threaded boss-like extension, to which is screwed a casing 7, terminating in a hollow nozzle 8, said nozzle fitting into a conical seat arranged on one side of the manifold and in line with the supply-controlling valve 4. When this valve 4 is open, gas from the manifold is admitted into the valve-casing 7, from which the supply for the pilot and burner is furnished. The end wall of the threaded boss is provided with a port, 9, designed to register with a port 10 in a rotary valve 11. This valve is mounted upon the end of a rock-shaft 12, finding bearings in the end wall of the threaded boss and in a nipple 13, screwed into the inner wall of the concentric ring of the burner. The inner end of this rock-shaft is provided with a rock-arm 14, which is received in an opening in a yoke 15, connected to a vertically-movable post 16. The upper end of this post is provided with a head 17, designed to come in contact with the vessel on the burner, so that the weight of the vessel will force the post and yoke downwardly and rotate the valve 11 to place the ports 9 and 10 in registration. A coiled spring 18 is wound about the shaft 12, so as to hold the valve 11 to its seat. A flat leaf-spring 19 is secured in position to the under side of the burner and has its free end bearing against the under side of the yoke 15, so as to raise the yoke and post in the absence of a vessel and in so doing rotate the valve 11 to closed position. A stem 20 is provided on the under side of the yoke and operates in a suitable guideway for well-understood purposes. The upper guide for the post consists of a plate 21, closing the opening through the inner concentric ring and serving to prevent the heat from the burner affecting the moving parts of the device under said plate.

22 indicates an opening leading to a pilot-light nozzle 23, arranged under an overhanging hood or shelf 24. Under this hood or shelf are arranged a series of small burner-openings 25, whose purpose is to lead the flame from the pilot-light to the larger openings of the burner. I have found by experiment that the use of a pilot-light with a burner having large openings if one of the large openings is in line with the pilot-light has a tendency to blow out the pilot-light before the gas is ignited, the air in the burner rushing out in advance of the gas. By providing the series of leading-out openings 25 it will be seen that the air will not pass through these openings with sufficient force to extinguish the flame of the pilot-light, and when the gas issues from these openings it will be led out to the larger burner-openings, and thus the burner will be ignited. The purpose of the overhanging hood or shelf 24 is to prevent grease and foreign substances from falling upon the small burner-openings 25 and choking the same.

The end of the duct 22 terminates at the inner wall of the valve-casing 7 and is designed to register with an opening in the same, which opening is controlled by a needle-valve 26, whereby the amount of gas supplied to the pilot-opening may be regulated.

The operation of the device above described will be readily apparent. In practice when the valve 4 is opened to admit gas inside of the valve-chamber 7 a constant supply will be furnished the pilot-nozzle, and this can be ignited, the flame spreading under the hood or shelf 24. The amount of gas consumed by this pilot-light is very small, and this need not be ignited except when it is ready to use the burner. When a cooking vessel is set in position on the burner, the post 16 will be forced down, and this movement rotates the valve 11 to open the supply of gas from the valve-chamber 7 to the burner, the gas drawing in air through the openings in the mixing-chamber in a well-understood manner. As soon as the air in the burner is forced out and the gas passes through the openings of the burner the gas passing through the small openings 25 will be first ignited and ignition communicated to the gas issuing from the remaining openings of the burner. When the vessel is removed, the spring 19 forces the post up and rotates the valve 11 so as to shut off the supply of gas from the main burner; but the pilot-light continues to burn in readiness to ignite the gas from the main burner as soon as the vessel is again placed on the burner to depress post 16. When the valve 4 is operated to close the supply of gas to the burner, the pilot-light ceases burning.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. The combination with a burner, of a mixing-chamber, a rotary valve for controlling the supply of gas to said chamber, a rod on which said valve is mounted, a spring for holding said valve to its seat, a vertically-movable post, a rock-shaft on the valve-rod and coöperating with said post for operating said valve, and a spring for holding said post in an elevated position; substantially as described.

2. The combination with a burner, of a vertically-movable post, a yoke connected to said post, a rock-shaft having an arm engaging said yoke, a valve on the opposite end of said rock-shaft for controlling the supply of gas to the burner, a spring for holding said post and yoke in an elevated position, and means for holding said valve to its seat; substantially as described.

3. The combination with a burner and its mixing-chamber, of a valve for controlling the supply of gas to the mixing-chamber, a rod on which said valve is mounted, a rock-shaft on said rod, a vertically-movable post engaging said rock-shaft for operating said valve, a valve-casing, a valve for controlling the supply of gas to said casing, a pilot-nozzle, a duct leading from said valve-casing to said pilot-nozzle, and a valve for controlling said duct; substantially as described.

4. The combination with a gas-burner, of a protecting-hood overhanging a portion thereof, a series of small leading-out openings arranged under the hood for communicating the flame to the regular openings of larger size in the burner, a pilot-nozzle for directing a flame across the small leading-out openings under the hood, a source of supply for said pilot-nozzle, and means operated by a cooking vessel for controlling the admission of gas from said source of supply to the burner; substantially as described.

5. The combination with a burner, of a post mounted thereon, a yoke carried by said post, a rock-arm engaging said yoke, a rock-shaft upon which said arm is mounted, a rotary valve on said shaft for controlling the supply of gas to the burner, a spring for holding said valve to its seat, and a guard-plate 21 for preventing heat from affecting certain of said moving parts; substantially as described.

6. The combination with a gas-burner, of an overhanging hood, a pilot-nozzle under said hood, a series of small leading-out openings in the burner under the pilot-nozzle, and means for regulating the supply of gas to said pilot-nozzle; substantially as described.

7. In a gas-burner, the combination with a mixing-chamber provided with a threaded, hollow boss, of a valve-casing screwed onto said boss, a valve operating over the end of said boss to control an opening through which gas is admitted to the mixing-chamber, a nipple on the valve-casing designed to be received in a socket in a manifold, a needle-valve arranged in the manifold for controlling the supply of gas from the manifold to said nipple, and a duct in the gas-burner in communication with the interior of the valve-chamber, means for controlling the supply of gas to said duct, a pilot-nozzle supplied by said duct, and an overhanging hood or shelf on the burner arranged above said pilot-nozzle; substantially as described.

8. In a gas-burner, the combination with a mixing-chamber, of a port leading into said mixing-chamber, a valve for controlling said port, a rod on said valve, a rock-arm on said rod, means including a vertically-movable element operated by a cooking vessel for coöperating with said rock-arm and rod to move said valve to admit a supply of gas to the mixing-chamber and to the burner when the cooking vessel is in position over said burner, a coiled spring arranged on the rod for holding said valve to its seat, and a flat leaf-spring coöperating with said vertically-movable element for returning the same to normal position and operating said valve to shut off the supply of gas from the burner; substantially as described.

In testimony whereof I hereunto affix my signature, in the presence of two witnesses, this 7th day of November, 1903.

CHARLES VAN DYKE HILL.

Witnesses:
GEORGE BAKEWELL,
RALPH KALISH.